Feb. 23, 1960 C. D. MORLEY 2,925,924
TWIN BARREL FRICTION DRAFT GEAR
Filed Aug. 13, 1956 2 Sheets-Sheet 1
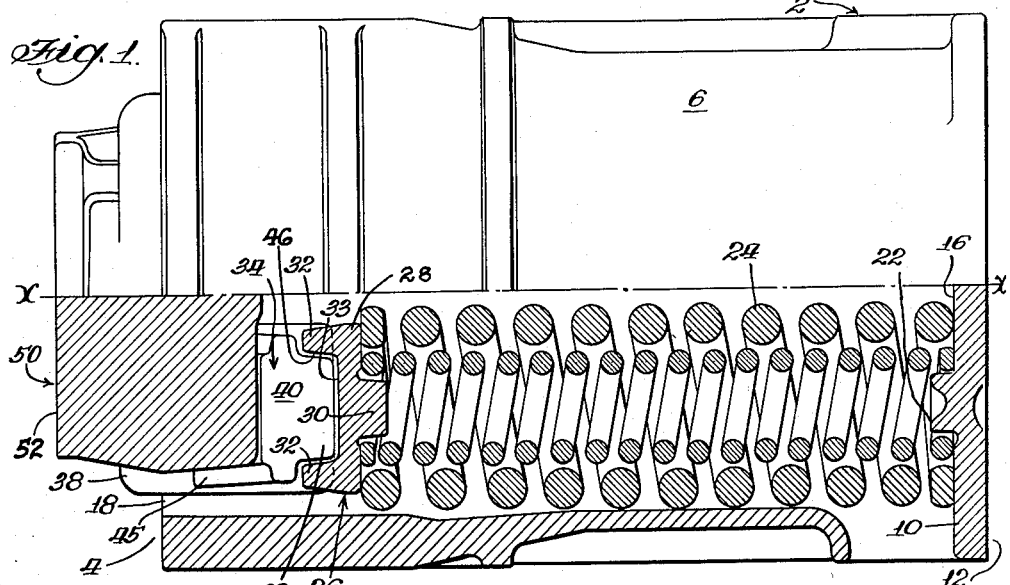
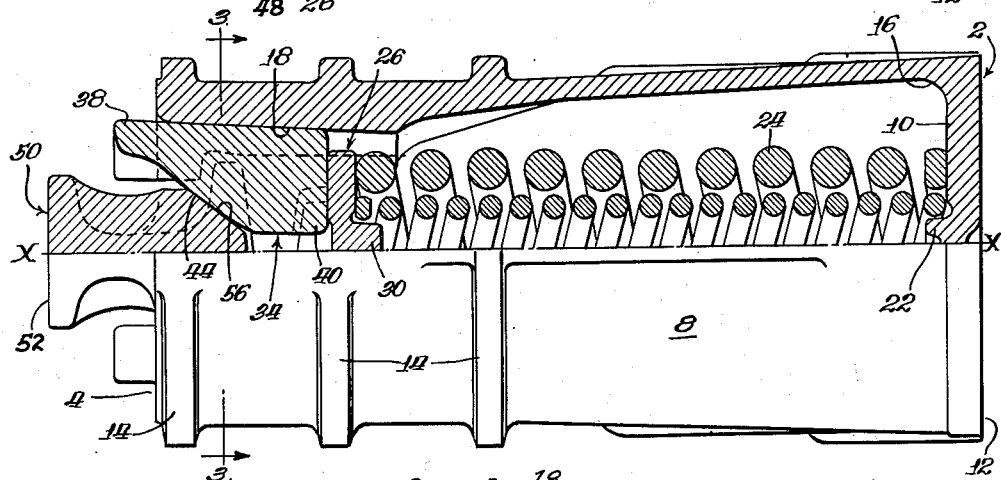
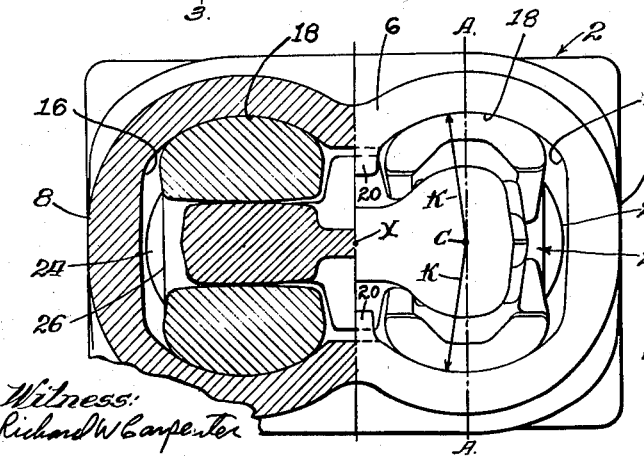
INVENTOR.
Clifford D. Morley
BY Walter L. Schlegel, Jr.
Atty.
Witness:
Richard W. Carpenter Feb. 23, 1960   C. D. MORLEY   2,925,924
TWIN BARREL FRICTION DRAFT GEAR
Filed Aug. 13, 1956   2 Sheets-Sheet 2
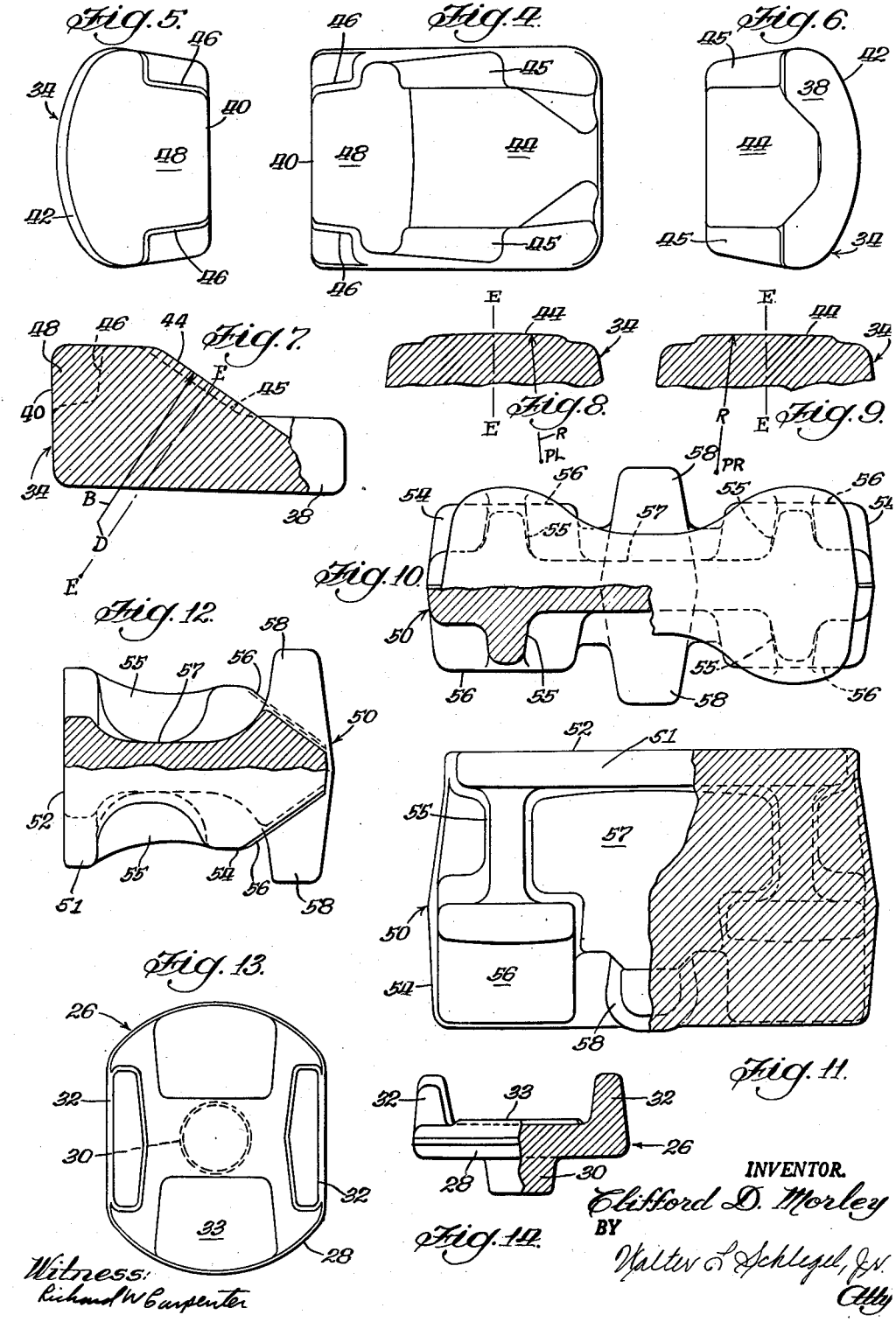
INVENTOR.
Clifford D. Morley
BY
Walter L. Schlegel, Jr.
Atty
Witness:
Richard W. Carpenter United States Patent Office 2,925,924
Patented Feb. 23, 1960

2,925,924

TWIN BARREL FRICTION DRAFT GEAR

Clifford D. Morley, Munster, Ind., assignor to American Steel Foundries, Chicago, Ill., a corporation of New Jersey Application August 13, 1956, Serial No. 603,688

7 Claims. (Cl. 213—32)

This invention relates to shock absorbing devices and more particularly to a draft gear arrangement for railway car coupling mechanisms. This invention represents an improvement over United States Letters Patent No. 2,646,894, issued July 28, 1953, to R. C. Pierce.

The invention comprehends an arrangement wherein separate pairs of spring loaded friction shoes are urged into frictional engagement with arcuate opposed friction surfaces of a double barreled housing by means of wedging action between the shoes and a wedge follower member abuttably engageable with other portions of a car coupling mechanism.

Because operation of a draft gear depends on smooth, uniform, and even movement of the coacting parts, unless these parts are fitted to each other at all times so as to cooperate and mate with each other, the gear will not operate properly. Although the coacting elements of a draft gear assembly may be perfectly fitted or adjusted to each other when the assembly is new, deformation of the parts, due to warping, impacts and functional wear incident to normal service, causes the parts to become misaligned thereby impeding or preventing their proper functioning. It is highly essential therefore, in order for the cooperating parts of a draft gear assembly to remain in proper alignment and relationship with each other for any appreciable period of service, that the parts be capable of adjusting to each other to compensate for the changes in their relative shapes.

The normal elastic deformation of a draft gear housing caused by the exertion of pressures upon certain portions thereof at initial impact of related friction elements causes serious problems of misalignment of related friction members and improper distribution of load forces therebetween.

For example, when pressure is applied by the wedge and friction shoes to the inner surfaces of opposite sides of the hollow housing, these sides tend to move outwardly while the adjacent sides of the housing tend to be displaced inwardly, thereby causing the housing friction surfaces to be laterally inclined relative to the surfaces of the friction shoes. Inasmuch as the deformation of the housing is greatest near its center, in the case of flat engaging friction surfaces, the angling between the shoes and the housing and/or between the shoes and the wedge means, results in a reduction of the areas of contact from surface to line contact and moves the areas of contact transversely outwardly from the center of the respective friction surfaces causing nonuniform distribution of load pressures upon the housing.

After a considerable amount of experimentation and research, I have discovered a way to utilize the elastic deformation of the housing, in cooperation with the movable parts, to improve the operation and function of a four-shoe type draft gear.

Accordingly, it is a primary object of this invention to provide an improved draft gear arrangement of simple design and construction wherein the mating elements are readily adaptable to each other at all times.

Another object of this invention is to provide a four-shoe, twin-barrel type of draft gear wherein a single wedge follower is engageable with two pairs of friction shoes which present outer friction surfaces engageable with a housing.

Another object of this invention is the provision of a draft gear arrangement affording a maximum amount of relative movement between the coacting elements, whereby the elements are capable of self-alignment and self-adjustment with respect to each other.

Another object of this invention is to provide a draft gear arrangement including spring cap means interlockingly interposed between friction shoes and spring means, and operable to limit lateral movement between the friction shoes and the spring means and to restrict rotational movement of the shoes relative to each other, in order to ensure greater stability for the device.

Another object of the invention is the provision of a four-shoe type draft gear arrangement wherein the shoes are afforded lateral rolling movement relative to the wedge means, as the housing deforms, in order to maintain the proper relationship between the friction shoes and housing to accommodate proper alignment of related engaging friction shoe and housing surfaces.

Another object of the invention is the provision of a draft gear arrangement wherein the lateral rolling movement of the friction shoes relative to the wedge, upon deformation of the housing, serves to effect the proper distribution of the load forces.

Another object of this invention is to provide a draft gear arrangement wherein the interengaging friction surfaces of the housing and friction shoes are arcuate.

A more specific object of the invention is the provision of an arrangement wherein the interengaging wedge surfaces of the friction shoes and wedge follower present areas of contact offset from the centers of the surfaces in the direction of the longitudinal axis of the gear.

These and other objects of the invention will be apparent from an examination of the following description and drawings, wherein:

Figure 1 is a fragmentary top plan view, partly in horizontal section, of a draft gear assembly embodying features of my invention;

Figure 2 is a side elevational view of the structure illustrated in Figure 1, with portions of the structure shown in vertical section;

Figure 3 is an end elevational view of the structure illustrated in Figure 2, as seen from the left, with portions of the structure shown in vertical section taken on line 3—3 of Figure 2;

Figure 4 is a front elevational view of a friction shoe employed in the device;

Figures 5 and 6 are end elevational views of the structure illustrated in Figure 4, as seen from the left and right, respectively;

Figure 7 is a side elevational view, partly in vertical section, of the structure illustrated in Figure 4;

Figure 8 is a fragmentary transverse sectional view taken substantially on center line E—E of Figure 7;

Figure 9 is a view similar to Figure 8 but illustrating a shoe disposed on the opposite side of the longitudinal center axis of the gear from the shoe illustrated in Figure 8;

Figures 10, 11, and 12 are top plan, front elevational, and end elevational views, respectively, of the wedge follower with portions of the structures being shown in section, and Figures 13 and 14 are top plan and front elevational views, respectively, of a spring cap employed in the device.

It will be apparent that certain elements have been intentionally omitted from certain views where they are illustrated to better advantage in other views.

Describing the invention in detail, and referring first to Figures 1 through 3 of the drawings, it will be seen that the device comprises a housing, indicated generally at 2, open at its forward end 4 and having side and end walls 6 and 8, respectively, and a base wall 10 interconnecting the side and end walls and closing the rearward end 12 of the housing. The side and end walls may be reinforced by a plurality of spaced peripheral ribs 14 to give added strength to the device.

The side walls 6, which are each in a form of a double arc, merge with the substantially flat end walls 8 to define therebetween a pair of communicating partly cylindrical spring cavities 16 extending longitudinally of the housing. As best seen in Figure 3 the forward end 4 of the housing 2 is somewhat twin-barreled in shape.

The side walls present pairs of opposed concave arcuate inner friction surfaces 18 which may taper outwardly toward the forward or open end 4 of the housing. As best seen in Figure 3, the opposed surfaces 18 presented by the respective side walls 6 are both shown as having radii struck from points C which are on or immediately adjacent the center of the transverse axis A—A interconnecting the surfaces.

Extending inwardly from the respective side walls 6 are a pair of retaining lugs 20 which are disposed between the arcuate portions of the respective side walls.

Seated against the base wall 10 of the housing are resilient resisting means such as coil compression springs 24 which are disposed in the respective cavities 16 in parallel relationship to each other and which may be retained in position by bosses 22 formed on base wall 10.

Spring caps 26, illustrated in detail in Figures 13 and 14, may be provided to lend stability to the device by limiting the lateral movement between the shoes and the resilient means and also restricting the rotational movement of the shoes relative to each other. Each cap 26 comprises a partly arcuate plate 28 having protruding from one side thereof an annular boss 30 preferably telescopically engaged with the related spring means 24. Extending outwardly from the opposite side of the base 28 are a pair of elongated ribs or tongues 32 spaced from each other at opposite sides of the base to define a seat 33 therebetween.

A pair of opposite facing right and left friction shoes indicated generally at 34 and illustrated in detail in Figures 4 through 9, are mounted on each spring cap 26. The shoes of each pair are substantially identical except for the crowned wedge surfaces 44, the difference of which are hereinafter described. Each shoe comprises a generally longitudinally extending wall or section 38 and a base section 40 formed at one end of the wall 38. The wall 38 presents an outwardly facing convex arcuate friction surface 42 and an inwardly facing crowned wedge surface 44 sloping from the inner side to the outer side of the wall 38. Adjacent the sides of wedge surface 44 of the shoe are a pair of longitudinally extending inclined recessed shoulder portions 45.

The wedge surface 44 of each shoe 34 is preferably crowned in both longitudinal and transverse directions, the radius B of the longitudinal surface seen in Figure 7 being drawn from a point D located on a center line E extending normal to and passing through the center of the surface 44. However, as best seen in Figures 8 and 9, the radii of the transverse surfaces of the right and left shoes 34 are drawn from points PR and PL, respectively, which are offset from the axis or center line E in a direction inwardly toward the longitudinal axis X of the draft gear. Thus, the highest area of the wedge surface 44 of each shoe is offset transversely from the center of the surface toward the longitudinal axis X of the draft gear.

The base section 40 of each shoe presents a pair of generally elongated recesses 46 spaced from each other and located on opposite sides of an outwardly extending central boss 48 adapted to fit flatly on the related spring cap 26 with the ribs 32 of the cap being disposed in the recesses 46 of the shoes. The function of the spring cap is to insure the proper alignment of the friction shoes relative to the longitudinal axis of the housing and the spring sets and thereby stabilize the position of the shoes relative to the longitudinal axis of the draft gear. The interlocking engagement between the shoes and springs is operable to limit the lateral movement of the shoes relative to the springs and the longitudinal axis of the gear and also serves to restrict the rotation of shoes relative to each other.

A wedge follower, indicated generally at 50 and shown in detail in Figures 10 to 12, is shown as comprising a generally elongated transversely extending plate 51 presenting a substantially flat outwardly facing abuttable surface 52 on one side thereof which is engageable with a buffing mechanism (not shown) of the related coupler mechanism (not shown). Formed on the opposite side of the plate are a pair of transversely spaced wedge portions 54 each of which present a pair of outwardly diverging wedge surfaces 56. Webs 55 and 57 serve to connect the wedge portions to the plate 51 and to each other. Also formed on the wedge follower 50 between the respective wedge portions 54 are a pair of oppositely extending retaining lugs 58 engageable with the corresponding retaining lugs 20 of the draft gear housing.

The wedge surfaces 56 of the wedge portions 54 of the follower are also crowned in both longitudinal and transverse directions in the same manner as the corresponding wedge surfaces 44 of the friction shoes, with the highest areas of the surfaces being offset transversely inwardly from the centers thereof in the direction of the longitudinal center axis X of the draft gear.

The wedge follower is mounted in the housing with the wedge surfaces 56 of each wedge portion 54 in frictional engagement with the wedge surfaces 44 of the respective pairs of friction shoes 34. Therefore it will be seen that the areas of contact between the engaging surfaces 56 and 44 of the follower and friction shoe members, respectively, are also offset transversely inwardly toward the longitudinal center axis X of the draft gear.

Thus, it will be understood that in operation, at the initial impact, forces exerted upon the inner surfaces of the walls of the housing cause it to deform with the friction walls being displaced outwardly. The arcuate form of the walls and shoes permits the shoes to roll on the housing walls so that the areas of contact between the shoes and wedge follower are displaced outwardly, from their original inwardly offset locations, toward the centers of the respective engaging surfaces whereby the load forces are properly distributed upon the housing and all of the related draft gear elements are maintained in alignment with each other.

I claim:

1. A draft gear comprising, in combination: a housing open at one end and having spaced side walls and spaced end walls, a base wall interconnecting the walls and closing the other end of the housing, said side walls presenting opposed pairs of coacting arcuate inner friction surfaces, the corresponding surfaces of each of the respective pairs having radii drawn from points immediately adjacent the midpoint of the axis interconnecting said corresponding surfaces, and retaining lugs projecting inwardly from the respective side walls and disposed between the surfaces of said side walls; independent spring means in the housing seated against the base wall and disposed in parallel relation to each other; spring caps seated on the respective spring means, each of said caps presenting a pair of elongated spaced parallel tongues extending outwardly therefrom on the side of the cap remote from the spring means; pairs of oppositely facing friction shoes mounted on the respective spring caps and presenting spaced recesses receiving the tongues of the respective caps, said friction shoes presenting outer arcuate friction surfaces engageable with adjacent friction surfaces of the housing and presenting inwardly facing wedge surfaces; a wedge member seated on the friction shoes and comprising a pair of spaced wedge portions each presenting a pair of diverging wedge surfaces engageable with the wedge surfaces of the related shoes, the wedge surfaces of the shoes and wedge member being crowned in transverse and longitudinal directions, the radii of the surfaces in a transverse direction being drawn from points offset inwardly from the surface centers toward the longitudinal axis of the draft gear, and a pair of outwardly facing lugs on the wedge member engageable with the lugs on the housing and operable to retain the movable members of the draft gear within the housing.

2. A draft gear comprising, in combination: a housing open at one end and having spaced side walls and spaced end walls, a base wall interconnecting said walls and closing the other end of the housing, said side walls presenting opposed pairs of coacting arcuate friction surfaces, lug means on the housing, independent parallel spring means disposed in the housing and seated against the base wall; spring caps seated on the respective spring means; pairs of opposite facing friction shoes seated on the respective spring caps in interlocking engagement therewith, said friction shoes presenting outer arcuate friction surfaces engageable with the related friction surfaces of the housing and presenting inner wedge surfaces; a wedge member comprising a pair of spaced wedge portions seated on the respective pairs of friction shoes, each wedge portion presenting a pair of diverging wedge surfaces engageable with the wedge surfaces of the related friction shoes, the wedge surfaces of the wedge member and the friction shoes being crowned in directions both longitudinally and transversely thereof, the radii of the transverse wedge surfaces being drawn from points on a line offset inwardly toward the longitudinal axis of the draft gear from a center line normal to the surfaces, and lugs on the wedge member engageable with the lugs on the housing member and operable to retain the movable members of the draft gear within the housing.

3. A draft gear comprising an elastic housing with two spaced side walls and two spaced end walls and a base wall, two pairs of internal arcuate friction surfaces disposed on the two side walls, the surfaces of each pair of the internal arcuate friction surfaces facing each other and converging inwardly in a direction toward the base wall, the corresponding surfaces of the two pairs being arranged on the same side wall, two pairs of friction shoes having arcuate faces engaging the respective friction surfaces, said shoes having wedge faces converging inwardly of the housing in a direction toward the base wall, a wedge having two pairs of wedge faces, the wedge faces of each pair converging inwardly of the housing in a direction toward the base wall and engaging related wedge faces of the related friction shoes, the wedge faces of the shoes and wedge being crowned from their inner to their outer extremities and also being crowned transversely thereof, wedge faces of the shoes and wedge being interengageable at the center of said wedge faces when the gear is in closed position, and spring means in said housing resisting inward movement of the shoes.

4. A draft gear comprising an elastic housing with two spaced side walls and two spaced end walls and a base wall, two pairs of internal arcuate friction surfaces disposed on the two side walls, the surfaces of each pair of the internal arcuate friction surfaces facing each other and converging inwardly in a direction toward the base wall, the corresponding surfaces of the two pairs being arranged on the same side wall, two pairs of friction shoes having arcuate faces engaging the respective friction surfaces, a wedge having two pairs of wedge faces, the wedge faces of each pair converging inwardly of the housing in a direction toward the base wall and engaging adjacent wedge faces of the related friction shoes, each of the wedge faces of the wedge being crowned from its inner to its outer extremities and also being crowned transversely thereof, the high point of the transverse crown being closer than the center points of the wedge face to the longitudinal axis of the gear, and spring means in said housing resisting inward movement of the shoes.

5. A draft gear comprising in combination: an elastic housing open at one end and having spaced side walls and spaced end walls, a base wall interconnecting said side and end walls and closing the other end of the housing, said side walls presenting opposed sets of coacting arcuate friction surfaces, independent parallel spring means disposed in the housing and seated against the base wall, spring cap means seated on said spring means, pairs of oppositely facing friction shoes seated on said spring cap means, said friction shoes presenting outer arcuate friction surfaces engageable with the related friction surfaces of the housing and presenting a set of inner wedge surfaces, a wedge member retained by means of engageable lugs on the housing and comprising a pair of spaced wedge portions seated on respective pairs of friction shoes, each wedge portion presenting a set of diverging wedge surfaces engageable respectively with the wedge surfaces of the related friction shoes, the wedge surfaces of the wedge member and the friction shoes being crowned from their inner to their outer extremities and also being crowned transversely thereof, with the highest point of the transverse crown on the wedge surfaces of at least one set being offset transversely inwardly from the centers of said last-mentioned wedge surfaces in the direction of the longitudinal axis of the gear, whereby areas of coengaging contact between the wedge surfaces of the shoes and the wedge surfaces of the wedge portions are approximately centered on the wedge surfaces when the draft gear is in the closed condition, and are offset from the centers of the wedge surfaces by a substantial distance when the draft gear is in the open condition.

6. A draft gear comprising in combination: an elastic housing open at one end and having spaced side walls and spaced end walls, a base wall interconnecting said side and end walls and closing the other end of the housing, said side walls presenting opposed sets of coacting arcuate friction surfaces, independent parallel spring means disposed in the housing and seated against the base wall, spring cap means seated on said spring means, pairs of oppositely facing friction shoes seated on said spring cap means, said friction shoes presenting outer arcuate friction surfaces engageable with the related friction surfaces of the housing and presenting inner wedge surfaces, a wedge member retained by means of engageable lugs on the housing and comprising a pair of spaced wedge portions seated on respective pairs of friction shoes, each wedge portion presenting a pair of diverging wedge surfaces engageable with the wedge surfaces of the related friction shoes, and the wedge surfaces of the wedge member and the friction shoes being crowned longitudinally and transversely of the gear and being rockably interengaged at the centers of said wedge surfaces when the draft gear is in closed position.

7. A draft gear comprising in combination: an elastic housing open at one end and having spaced side walls and spaced end walls, a base wall interconnecting said walls and closing the other end of the housing, said side walls presenting opposed pairs of coacting arcuate friction surfaces, clutch means in the housing comprising independent parallel spring means disposed in the housing and seated against the base wall, spring cap means seated on the spring means, pairs of oppositely facing friction shoes seated on the spring cap means in interlocking engagement therewith, said friction shoes presenting outer arcuate friction surface engageable with the related friction surfaces of the housing and presenting inner wedge surfaces, a wedge member comprising a pair of spaced wedge portions seated on respective pairs of friction shoes, each of said wedge portions presenting a pair of diverging wedge surfaces engageable with the wedge surfaces of the related friction shoes, all of said wedge surfaces being crowned longitudinally and transversely of the gear, with the high point of each transverse crown being offset transversely inwardly from the center thereof in the direction of the longitudinal axis of the gear, and retaining means operable to retain the clutch means within the housing.

References Cited in the file of this patent

UNITED STATES PATENTS

| | | |
|---|---|---|
| 1,913,414 | Schmidt et al. | June 13, 1933 |
| 2,280,428 | Cottrell | Apr. 21, 1942 |
| 2,417,410 | Gray | Mar. 18, 1947 |
| 2,592,731 | Peterson | Apr. 15, 1952 |
| 2,646,894 | Pierce | July 28, 1953 |